US012633798B2

(12) United States Patent
Yamada et al.

(10) Patent No.: US 12,633,798 B2
(45) Date of Patent: May 19, 2026

(54) ELECTRIC MOTOR

(71) Applicant: FUJITSU GENERAL LIMITED, Kanagawa (JP)

(72) Inventors: Masaki Yamada, Kanagawa (JP); Takuya Hamano, Kanagawa (JP); Akinori Ando, Kanagawa (JP); Masanori Murakami, Kanagawa (JP)

(73) Assignee: FUJITSU GENERAL LIMITED, Kanagawa (JP)

( * ) Notice: Subject to any disclaimer, the term of this patent is extended or adjusted under 35 U.S.C. 154(b) by 216 days.

(21) Appl. No.: 18/721,885

(22) PCT Filed: Dec. 21, 2022

(86) PCT No.: PCT/JP2022/047082
§ 371 (c)(1),
(2) Date: Jun. 20, 2024

(87) PCT Pub. No.: WO2023/127633
PCT Pub. Date: Jul. 6, 2023

(65) Prior Publication Data
US 2025/0088068 A1      Mar. 13, 2025

(30) Foreign Application Priority Data

Dec. 28, 2021      (JP) ................................ 2021-214127

(51) Int. Cl.
*H02K 5/24*          (2006.01)
*H02K 5/173*        (2006.01)
(Continued)

(52) U.S. Cl.
CPC ............. *H02K 5/24* (2013.01); *H02K 5/1732* (2013.01); *H02K 5/18* (2013.01); *H02K 7/083* (2013.01)

(58) Field of Classification Search
CPC .......... H02K 5/24; H02K 5/1732; H02K 5/18; H02K 7/083
See application file for complete search history.

(56) References Cited

U.S. PATENT DOCUMENTS

2008/0252154 A1*  10/2008  Yamashita ............... H02K 5/24
                                                                310/90
2015/0188383 A1    7/2015  Okada et al.

FOREIGN PATENT DOCUMENTS

CN          112366877 A      2/2021
EP            3961873 A1      3/2022
(Continued)

*Primary Examiner* — Sean Gugger
(74) *Attorney, Agent, or Firm* — Paratus Law Group, PLLC

(57)          ABSTRACT

There is provided an electric motor in which a flange portion can be miniaturized in a radial direction while securing a space for fastening a metal member to the flange portion. The electric motor includes: a rotor that includes a rotation shaft and is disposed on an inner diameter side of a stator that is integrally formed with a resin outer shell that includes an opening end portion that is provided at an end portion on one side in an axial direction, and a cylindrical portion that protrudes from a bottom portion that is provided at an end portion on the other side in the axial direction toward the other side; a lid member that covers the opening end portion and includes a first bearing housing portion, the first bearing housing portion housing a first bearing that rotatably supports the rotation shaft; a metal member that is disposed on an outer peripheral surface of the resin outer shell and electrically connects the second bearing housing portion held by the cylindrical portion; and a vibration isolating member that is attached to the cylindrical portion. The second bearing housing portion includes a flange portion, the flange portion extending from a cylinder portion in an outer diameter direction, the cylinder portion housing a (Continued)

second bearing that rotatably supports the rotation shaft, the cylindrical portion includes a recessed portion on an outer peripheral surface, the vibration isolating member includes a projecting portion that engages with the recessed portion, and at least part of a fastening member is located in a region overlapping with the recessed portion when viewed from the axial direction, the fastening member fastening the metal member to the flange portion.

4 Claims, 9 Drawing Sheets

(51) Int. Cl.
   *H02K 5/18*          (2006.01)
   *H02K 7/08*          (2006.01)

(56)                References Cited

FOREIGN PATENT DOCUMENTS

| | | |
|---|---|---|
| JP | 2015-126583 A | 7/2015 |
| JP | 6855690 B2 | 4/2021 |
| WO | WO 2021/017191 A1 | 2/2021 |

* cited by examiner

ELECTRIC MOTOR

CROSS REFERENCE TO PRIOR APPLICATION

This application is a National Stage Patent Application of PCT International Patent Application No. PCT/JP2022/047082 (filed on Dec. 21, 2022) under 35 U.S.C. § 371, which claims priority to Japanese Patent Application No. 2021-214127 (filed on Dec. 28, 2021), which are all hereby incorporated by reference in their entirety.

TECHNICAL FIELD

The present invention relates to an electric motor that includes a metal member for suppressing electrolytic corrosion that occurs in a bearing housing portion of the electric motor.

BACKGROUND ART

In the past, an electric motor that is a brushless DC motor and includes a metal conductive member for electrically connecting a bearing housing portion on the output side and a bearing housing portion on the counter-output side to each other in order to suppress electrolytic corrosion has been known.

For example, Patent Literature 1 describes a structure of a motor including: a stator covered by a bottomed cylindrical motor outer shell; a rotor that includes a rotation shaft and is rotatably disposed inside; bearings that support one end side and the other end side of the rotation shaft of the rotor; a bearing house that houses the bearings; and a metal conductive plate (metal member) that electrically connects the bearings to each other, the bearing house including a flange portion that extends from the bearing house in the radial direction and includes a hole, the conductive plate and the hole being fastened with a screw and electrically connected to each other.

CITATION LIST

Patent Literature

Patent Literature 1: Japanese Patent No. 6855690

DISCLOSURE OF INVENTION

Technical Problem

In Patent Literature 1, in order to secure a space for fixing the flange portion of the bearing house and the conductive plate as a metal member with the screw, it has been necessary to increase the size of the flange portion in the radial direction. For this reason, there is a problem that the flange portion becomes larger and the production cost of the bearing housing portion increases.

In view of the circumstances as described above, it is an object of the present invention to provide an electric motor in which a flange portion can be miniaturized in a radial direction while securing a space for fastening a metal member to the flange portion.

Solution to Problem

In order to achieve the above-mentioned object, an electric motor according to an embodiment of the present invention includes: a cylindrical resin outer shell that includes an opening end portion that is provided at an end portion on one side in an axial direction, a bottom portion that is provided at an end portion on the other side in the axial direction, and a cylindrical portion that protrudes from the bottom portion toward the other side in the axial direction; a stator that includes a coil and a stator core that are integrally formed with the resin outer shell; a rotor that includes a rotation shaft and is disposed on an inner diameter side of the stator; a lid member that covers the opening end portion of the resin outer shell and includes a first bearing housing portion, the first bearing housing portion being formed of a metal and housing a first bearing that rotatably supports the rotation shaft; a second bearing housing portion that is formed of a metal, at least part of the second bearing housing portion being held by the cylindrical portion of the resin outer shell; a metal member that is disposed on an outer peripheral surface of the resin outer shell and electrically connects the first bearing housing portion and the second bearing housing portion to each other; and a vibration isolating member that is attached to the outer peripheral surface of the cylindrical portion. The second bearing housing portion includes a cylinder portion and a flange portion, the cylinder portion housing a second bearing that rotatably supports the rotation shaft, the flange portion extending from the cylinder portion in an outer diameter direction, at least one recessed portion is formed on an outer peripheral surface of the cylindrical portion of the resin outer shell, the vibration isolating member includes a projecting portion that engages with the recessed portion, and at least part of a fastening member is located in a region overlapping with the recessed portion when viewed from the axial direction, the fastening member fastening the metal member to the flange portion.

In accordance with the electric motor, the fastening member fastens the metal member to the flange portion at a position where at least part of the fastening member overlaps with the recessed portion of the cylindrical portion when viewed from the axial direction. That is, since the metal member and the flange portion can be fastened by the fastening member using the space of the recessed portion, the flange portion can be miniaturized in the radial direction while securing a space for the flange portion to be fastened to the metal member, and the production cost can be reduced.

The vibration isolating member may be disposed at a position overlapping with the fastening member when viewed from the axial direction.

The bottom portion may further include a regulatory portion that comes into contact with the vibration isolating member to form a predetermined gap between the vibration isolating member and the fastening member.

The second bearing housing portion may protrude from the bottom portion toward a side opposite to the opening end portion, and the cylindrical portion may cover the outer peripheral surface of the cylinder portion.

Advantageous Effects of Invention

In accordance with the present invention, it is possible to provide an electric motor in which a flange portion can be miniaturized in a radial direction while securing a space for fastening a metal member to the flange portion.

MODE(S) FOR CARRYING OUT THE INVENTION

Next, an embodiment of the present invention will be described with reference to the drawings. In the description of the drawings below, the same or similar portions will be denoted by the same or similar reference symbols. However, it should be noted that the drawings are schematic and can be different from the real ones. Therefore, specific constituent parts should be determined with reference to the following description.

Further, the embodiment shown below exemplifies devices and methods for embodying the technical idea of the present invention, and the technical idea of the present invention does not limit the shapes, structures, arrangement, and the like of the constituent parts to those described below. The technical idea of the present invention can be modified in various ways within the technical scope defined by the claims.

Figure 1:
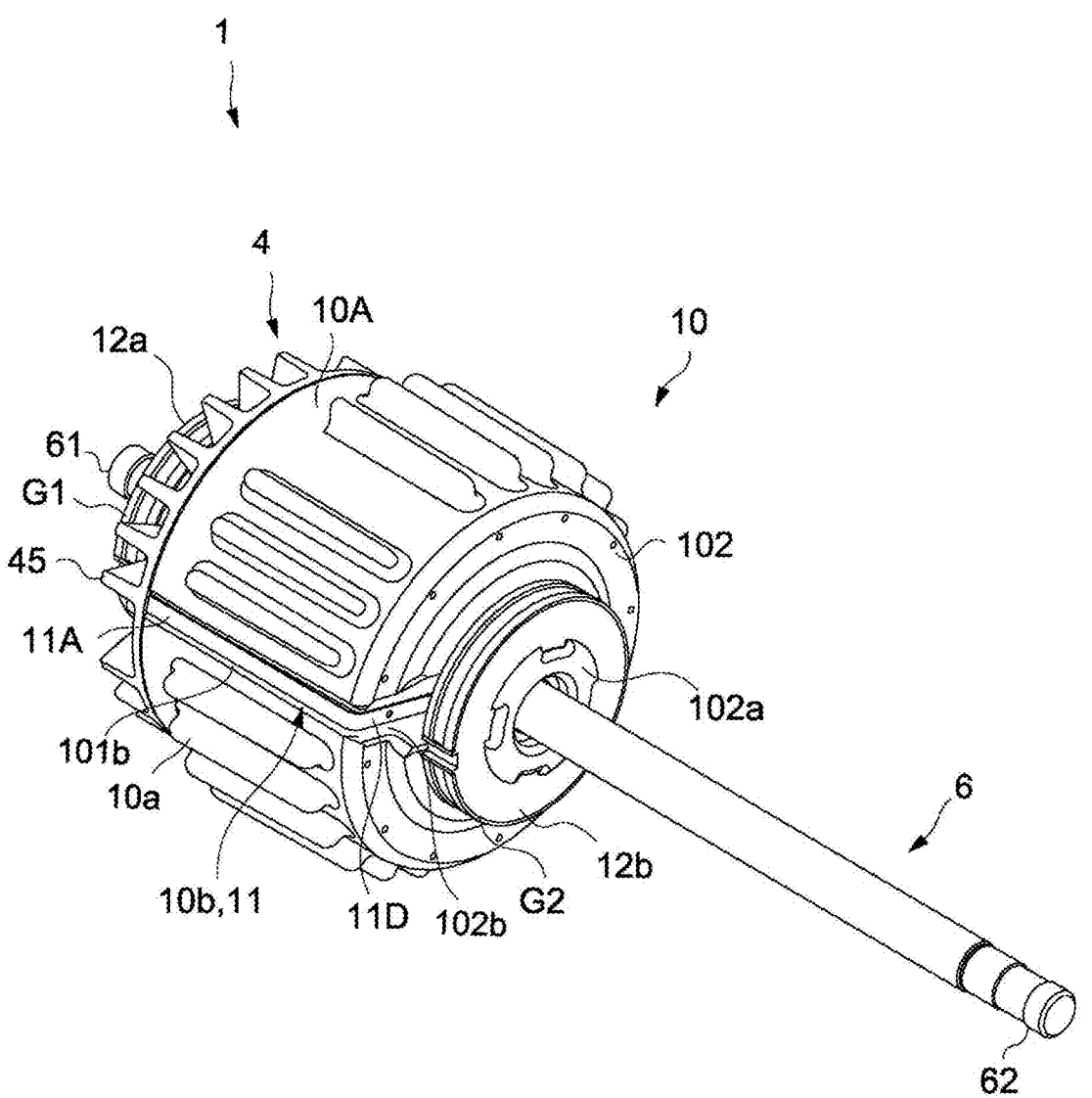
FIG. 1 is a perspective view of an electric motor according to an embodiment of the present invention.
Figure 2:
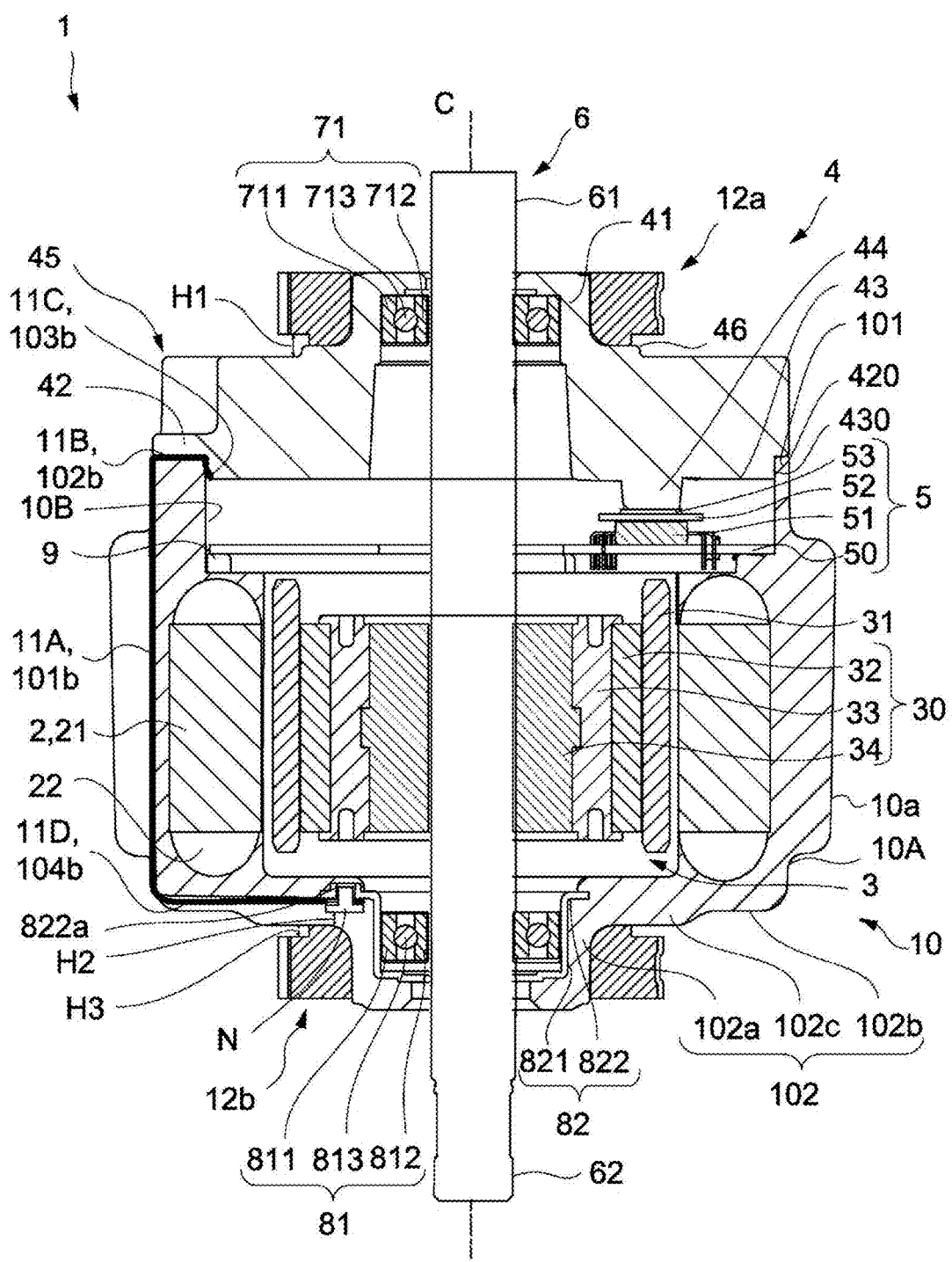
FIG. 2 is a cross-sectional view of the electric motor.

FIG. 1 is a perspective view of an electric motor 1 according to the embodiment, and FIG. 2 is a cross-sectional view of the electric motor 1 according to the embodiment. The electric motor 1 according to this embodiment is, for example, a brushless DC motor, is attached to a wall, ceiling, or the like of a building, and is used as a drive source for a blower in a duct that communicates indoors and outdoors.

[Overall Configuration of Electric Motor]

The electric motor 1 includes a resin outer shell 10, a stator 2 (stator core 21), a rotor 3, a lid member 4, a circuit board 5, a metal member 11, and a fastening member N.

A brushless DC motor of an inner rotor type in which the columnar rotor 3 that includes a permanent magnet portion 32 is rotatably disposed inside the radial direction of the cylindrical stator 2 that generates a rotating magnetic field will be described below as an example of the electric motor 1.

Further, in the following description, an axial center C of a rotation shaft 6 is also the central axis of the electric motor 1, i.e., the rotation axis of the rotor 3. The axial direction is a direction parallel to the rotation shaft (axial center C) of the electric motor 1. The radial direction is a direction that passes through the axial center C and is orthogonal to the axial direction. Further, the inner diameter side is the inside in the radial direction (inner peripheral surface side of the cylindrical stator 2), and the outer diameter side is the outside in the radial direction (outer peripheral surface side of the cylindrical stator 2). Further, the circumferential direction is a direction of rotation around the axial center C.

(Rotor)

As shown in FIG. 2, the rotor 3 includes an annular permanent magnet portion 31, a rotor body 30, and the rotation shaft 6. The rotor body 30 has an outer peripheral surface to be fixed to the permanent magnet portion 31 and an inner peripheral surface to be fixed to the rotation shaft 6.

The rotor 3 is of a surface magnet type in which the permanent magnet portion 31 is annularly disposed on the above outer peripheral surface. The permanent magnet portion 31 is annularly formed to include a plurality of (e.g., 8 or 10) permanent magnets such that N poles and S poles appear alternately at equal intervals in the circumferential direction. Note that although the permanent magnet portion 31 is typically formed of a sintered metal such as an Nd—Fe—B alloy, a plastic magnet that is annularly formed by hardening a magnet powder with a resin may be used instead.

The rotor body 30 includes an outer peripheral core 32, an insulation member 33, and an inner peripheral core 34.

The outer peripheral core 32 is annularly formed and forms the outer peripheral surface of the rotor body 30. The outer peripheral core 32 is a stacked body of plates formed of a soft magnetic material such as a plurality of electromagnetic steel plates.

The inner peripheral core 34 is annularly formed and is a stacked body of plates formed of a soft magnetic material such as a plurality of electromagnetic steel plates forming the inner peripheral surface of the rotor body 30. The rotation shaft 6 is fixed to the center of the inner peripheral core 34 by press fitting, caulking, or the like.

The insulation member 33 electrically insulates the outer peripheral core 32 and the inner peripheral core 34 from each other. This makes it possible to reduce the difference between the static capacitance on the stator side of the electric motor 1 and the static capacitance on the rotor side to suppress the electrolytic corrosion of the bearing. The insulation member 33 is formed of a dielectric resin such as PBT (polybutylene terephthalate) and PET (polyethylene terephthalate) and fixed between the outer peripheral core 32 and the inner peripheral core 34. The insulation member 33 may be an annular molded body or a resin material deposited between the outer peripheral core 32 and the inner peripheral core 34 by insert-molding or the like. Note that although a case where the rotor body 30 is divided into the outer peripheral core 32 and the inner peripheral core 34 and the insulation member 33 is formed between them has been illustrated, the rotor body 30 may be formed of a cylindrical iron core that does not include the insulation member 33.

(Stator)

The stator 2 includes a stator core 21, coils 22, and an insulator (illustration omitted). The stator core 21 is, for example, a stacked body of plates formed of a soft magnetic material such as a plurality of electromagnetic steel plates. The stator core 21 includes an annular yoke portion and a plurality of teeth portions that protrude from the yoke portion to the inner peripheral side. The coil 22 is wound around each teeth portion of the stator core 21 via the insulator. The plurality of coils 22 includes coils 22 corresponding to three phases of a U phase, a V phase, and a W phase. These coils are connected to each other at, for example, an electrical neutral point (N point). The outer peripheral surface of this stator 2 (stator core 21) is covered by the resin outer shell 10 (see FIG. 2). The stator core 21 of the stator 2 is disposed so as to face the permanent magnet portion 32 of the rotor 3 via a gap (magnetic gap) in the radial direction.

(Resin Outer Shell)

The resin outer shell 10 is formed of an insulating resin material. As shown in FIG. 1 and FIG. 2, the resin outer shell 10 includes an opening end portion 101 at an end portion on one side in the axial direction (in this embodiment, the side of an opposite output end portion 61 of the rotation shaft 6) and a bottom portion 102 at an end portion on the other side in the axial direction (in this embodiment, the side of the output end portion 62 of the rotation shaft 6), and is formed in a hollow cylindrical shape. Here, the opposite output end portion 61 is an end portion opposite to the output end portion 62 of the rotation shaft 6. The output end portion 62 is an end portion of the electric motor 1 on the load side (side to be connected to the load).

As described above, the resin outer shell 10 is integrally molded with the stator 2. The resin material forming the resin outer shell 10 is not particularly limited, and the resin outer shell 10 is formed of, for example, BMC (Bulk Molding Compound: thermoplastic resin containing an unsaturated polyester as a main component).

Further, the resin outer shell 10 has a placement surface 9. The placement surface 9 is the inner peripheral surface of the resin outer shell 10 and is provided on the side of the opposite output end portion 61 of the rotation shaft 6 via a gap from the rotor 3. The placement surface 9 is provided to be capable of supporting the circuit board 5 described below. In this embodiment, the placement surface 9 is a surface of a step on the side of the above opposite output end portion 61, the step being provided to protrude from the inner peripheral surface of the resin outer shell 10 toward the inner diameter side. The placement surface 9 may be continuously formed on the inner peripheral surface of the resin outer shell 10 in the circumferential direction thereof, or may be formed at a plurality of locations at intervals in the circumferential direction thereof.

Figure 5:
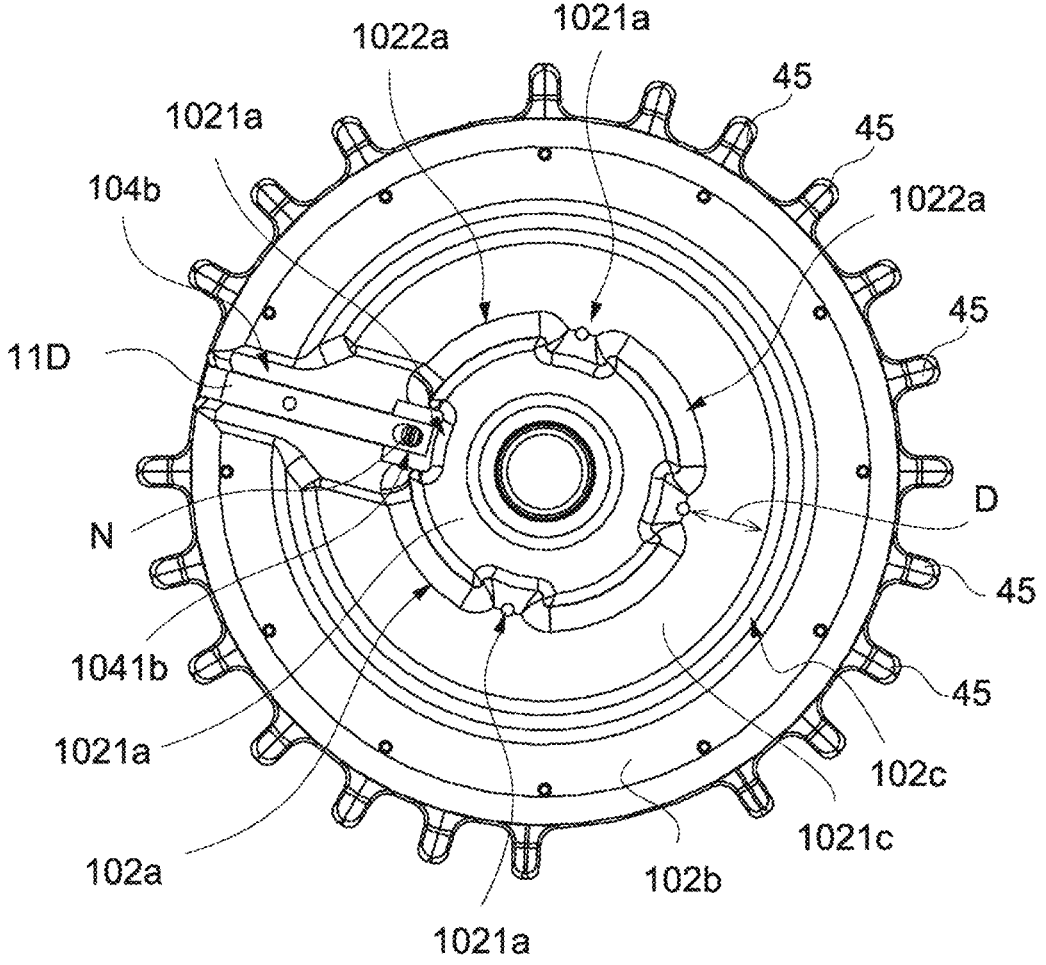
FIG. 5 is a diagram of the electric motor when viewed from a side of a bottom portion.

FIG. 5 is a diagram of the electric motor 1 when viewed from the side of the bottom portion 102. As shown in FIG. 2 and FIG. 5, the bottom portion 102 of the resin outer shell 10 has a bottom surface 102b, a cylindrical portion 102a, and a second regulatory portion 102c. The cylindrical portion 102a houses a second bearing housing portion 82 that is formed of a metal. The second bearing housing portion 82 houses a second bearing 81 described below. The second bearing 81 is provided around the rotation shaft 6. The second regulatory portion 102c is disposed between the second vibration isolating member 12b and the fastening member N described below.

The bottom surface 102b is disposed on the side opposite to the opening end portion 101, has a substantially disc shape, and functions as the bottom of the resin outer shell 10.

Further, the cylindrical portion 102a has a hollow cylindrical shape that protrudes from the bottom surface 102b toward the side of the output end portion 62 of the rotation shaft 6. The cylindrical portion 102a surrounds the outer peripheral surface of the cylinder portion 821 described below included in the second bearing housing portion 82 when viewed from the axial direction. The cylindrical portion 102a holds the second bearing 81 by housing cylinder portion 821 of the second bearing housing portion 82 on the inner peripheral surface side of the cylindrical portion 102a. On the outer peripheral surface of the cylindrical portion 102a, a second recessed portion 1021a and a second projecting portion 1022a are alternately provided in the circumferential direction, the second recessed portion 1021a being recessed toward the inner diameter side when viewed from the axial direction, the second projecting portion 1022a protruding toward the outer diameter side. A second vibration isolating member 12b (described below) that engages with the second recessed portion 1021a and the second projecting portion 1022a is attached to the outer peripheral surface of the cylindrical portion 102a. The second recessed portion 1021a and the second projecting portion 1022a included in the cylindrical portion 102 function as a rotation stopper for the second vibration isolating member 12b.

The second regulatory portion 102c will be described below.

An outer-peripheral-surface projecting portion 10a that protrudes in the outer diameter direction is formed to extend in the axial direction on an outer peripheral surface 10A of the resin outer shell 10 in order to improve the heat dissipation performance. A plurality of outer-peripheral-surface projecting portions 10a is formed in the circumferential direction of the resin outer shell 10. The length of this outer-peripheral-surface projecting portion 10a extending in the axial direction and the protrusion height of the outer-peripheral-surface projecting portion 10a protruding in the outer diameter direction can be appropriately set.

By forming the outer-peripheral-surface projecting portion 10a, the surface area on the outer peripheral surface 10A of the resin outer shell 10 can be increased, so that heat dissipation can be improved.

Further, a groove portion 10b in which the metal member 11 described below is disposed is provided in the resin outer shell 10. The groove portion 10b includes a first groove portion 101b, a second groove portion 102b, a third groove portion 103b, and a fourth groove portion 104b.

As shown in FIG. 1 and FIG. 2, the first groove portion 101b is provided at a position of the outer peripheral surface 10A of the resin outer shell 10 that does not overlap with the outer-peripheral-surface projecting portion 10a and is formed in the outer peripheral surface 10A of the resin outer shell 10 along the axial direction. In this embodiment, the first groove portion 101b is located between two outer-peripheral-surface projecting portions 10a adjacent to each other in the circumferential direction on the outer peripheral surface 10A of the resin outer shell 10.

Further, the second groove portion 102b is connected to the first groove portion 101b on the side of the opening end portion 101 and formed in the opening end portion 101 along the radial direction. Further, the second groove portion 102b is formed at a position that overlaps with a fin portion 45 of the lid member 4 described below when viewed from the axial direction.

Further, the third groove portion 103b is connected to the second groove portion 102b on the side of an inner peripheral surface 10B of the resin outer shell 10 and formed in the inner peripheral surface 10B of the resin outer shell 10 along the axial direction. Further, the third groove portion 103b is formed at a position overlapping with the fin portion 45 of the lid member 4 described below when viewed from the axial direction.

Further, the fourth groove portion 104b is connected to the first groove portion 101b on the side of the bottom portion 102 and formed in the bottom portion 102 along the radial direction. Further, the fourth groove portion 104b is formed at a position overlapping with at least part of the second bearing housing portion 82 described below when viewed from the axial direction.

The width of the groove portion 10b only needs to be a size that houses the metal member 11 described below.

The depth of the first groove portion 101b in the radial direction is not particularly limited and is, for example, a depth in which a first metal portion 11A described below is housed.

The depth of the second groove portion 102b in the axial direction is not particularly limited and is, for example, the same or substantially the same as the thickness of a second metal portion 11B described below in the axial direction.

The depth of the third groove portion 103b in the outer diameter direction (on the side of the resin outer shell 10) is not particularly limited and is, for example, the same or substantially the same as the thickness of a third metal portion 11C described below in the radial direction.

The depth of the fourth groove portion 104b in the axial direction is not particularly limited and is, for example, a depth that accommodates the thickness of a fourth metal portion 11D described below in the axial direction.

The fourth groove portion 104b includes a through hole 1041b through which a fastening member N (e.g., a screw) that fastens a flange portion 822 of a second bearing housing unit 82 described below and the metal member 11 is inserted.

(Circuit Board)

The circuit board 5 includes a wiring board 50 and an electronic part 51 that is mounted on a surface of the wiring board 50 (surface of the rotation shaft 6 on the side of the opposite output end portion 61) and generates heat. The circuit board 5 has a disc shape, and the peripheral edge portion of the circuit board 5 is supported by the placement surface 9 and fixed to the resin outer shell 10 by, for example, adhesion, pressure-sensitive adhesion, screw fastening, or soldering. Note that a projecting portion for positioning and a recessed portion for positioning that engages with the above projecting portion may be respectively provided on the peripheral edge portion of the circuit board 5 and the inner peripheral surface of the resin outer shell 10. This allows the circuit board 5 to be fixed to the placement surface 9 while being positioned in the circumferential direction.

The electronic part 51 is mainly a semiconductor package part such as a power IC integrating a power MOSFET, an IGBT, or the like, and an IC for controlling a motor drive current, but may also be a passive part such as a capacitor.

Note that in addition to the electronic part 51, another part such as a connector part to be connected to a power cable is mounted on the wiring board 50, but illustration thereof is omitted. The above power cable is led out of the resin outer shell 10 through a cable insertion portion (illustration omitted) and connected to a power source (not shown), the cable insertion portion being formed in the vicinity of the opening end portion 101 of the resin outer shell 10 over a predetermined angular range in the circumferential direction.

(Bearing)

As shown in FIG. 2, a first bearing 71 is a ball bearing that includes an outer ring 711, an inner ring 712, a plurality of balls 713, and the like. The second bearing 81 is a ball bearing that includes an outer ring 811, an inner ring 812, a plurality of balls 813, and the like.

The outer ring 711 of the first bearing 71 is fixed to the lid member 4 (first bearing housing portion 41), and the inner ring 712 of the first bearing 71 is fixed to the side of the opposite output end portion 61 of the rotation shaft 6. The outer ring 811 of the second bearing 81 is fixed to the bottom portion 102 of the resin outer shell 10 (second bearing housing portion 82). The inner ring 812 of the second bearing 81 is fixed to the output end portion 62 of the rotation shaft 6. As a result, the rotation shaft 6 is rotatably supported around the axial center C with respect to the lid member 4 and the resin outer shell 10 by the first bearing 71 and the second bearing 81.

The second bearing housing portion 82 is formed of a metal and has a substantially cylindrical shape centered on the axial center C as described above. The second bearing housing portion 82 includes the cylinder portion 821 that houses the second bearing 81, and the flange portion 822 that extends from the cylinder portion 821 in the outer diameter direction, and is housed in the above-mentioned cylindrical portion 102a.

The flange portion 822 has an annular plate shape, and the flange portion 822 is provided at a position overlapping with the above-mentioned fourth groove portion 104b when viewed from the axial direction.

The flange portion 822 includes a flange hole 822a at a position overlapping with the through hole 1041b formed in the fourth groove portion 104b of the resin outer shell 10 when viewed from the axial direction. The flange hole 822a is fastened by the metal member 11 and the fastening member N described below via the through hole 1041b.

(Lid Member)

Figure 3:
FIG. 3 is a diagram of a lid member of the electric motor when viewed from a side of a fin.
Figure 3:
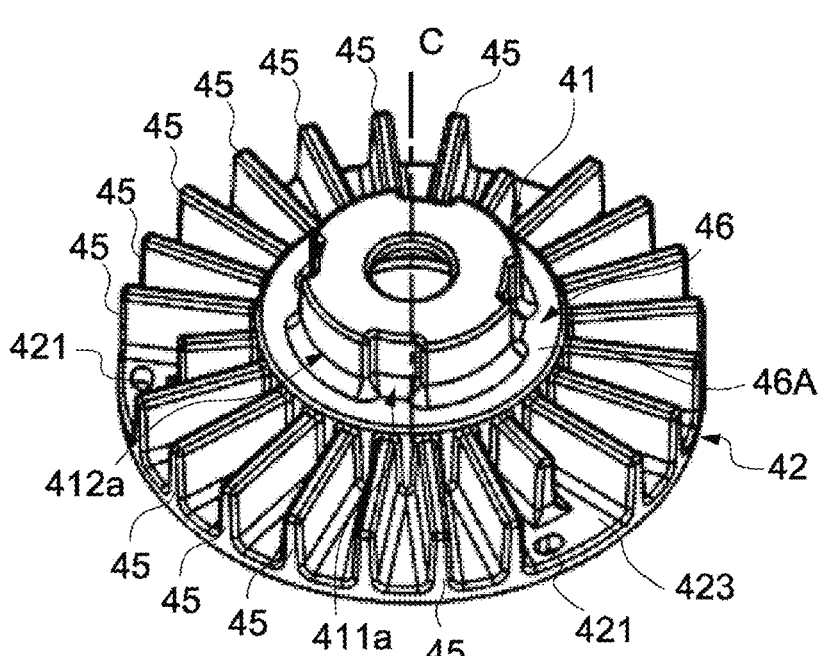
Figure 4:
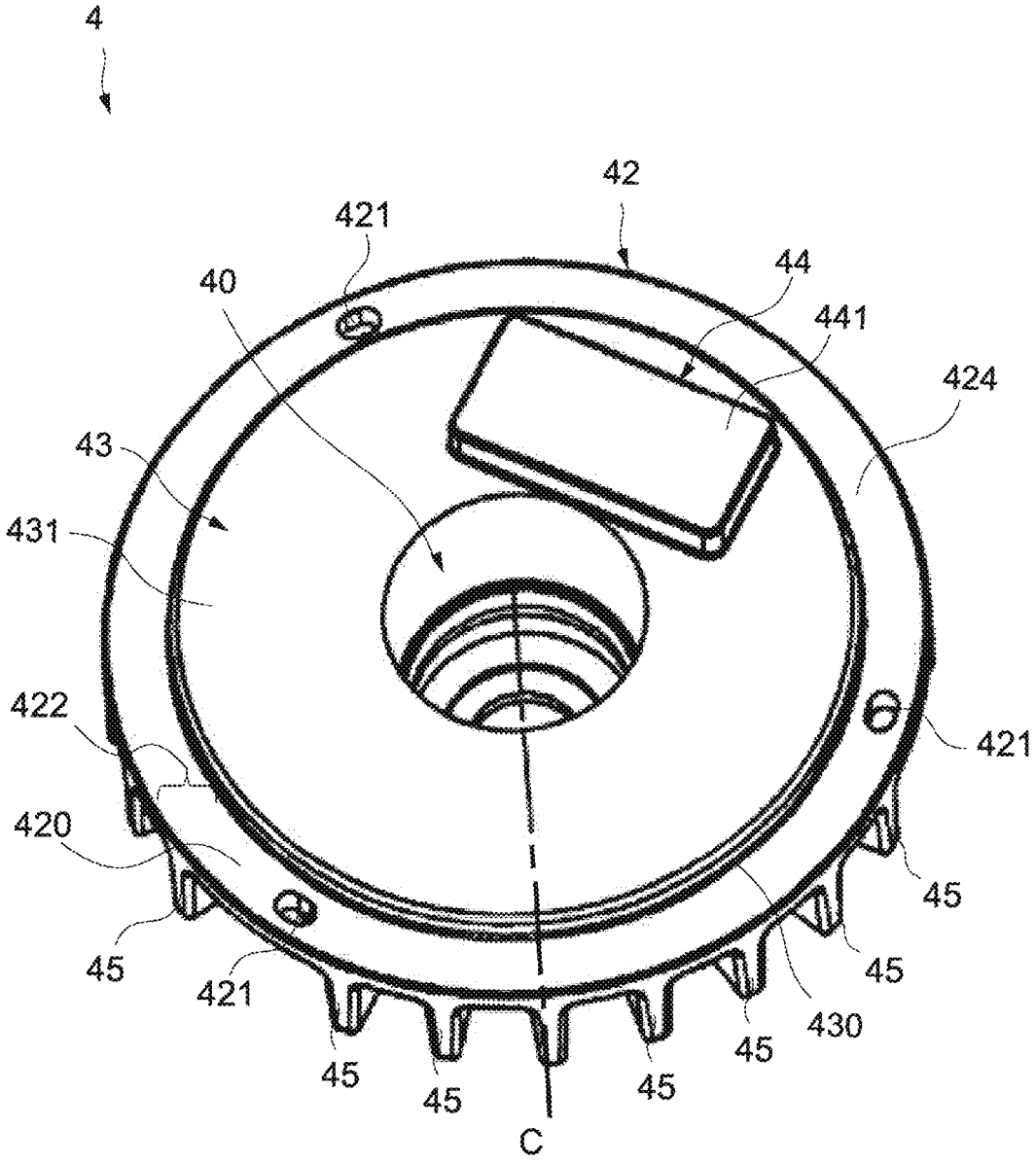
FIG. 4 is a diagram of the lid member of the electric motor when viewed from a side of a protruding portion.

FIG. 3 is a diagram of the lid member 4 when viewed from the side of the fin portion 45, and FIG. 4 is a diagram of the lid member 4 when viewed from the side of a protruding portion 44.

The lid member 4 includes the first bearing housing portion 41, a plate portion 42, an annular protruding portion 43, the protruding portion 44, the fin portion 45, and a first regulatory portion 46. The lid member 4 is attached and fixed to the opening end portion 101 of the resin outer shell 10. The lid member 4 is formed of a metal material having excellent thermal conductivity, such as aluminum, an aluminum alloy, and a magnesium alloy. In the lid member 4, the plate portion 42, the annular protruding portion 43, the protruding portion 44, and the fin portion 45 are integrally molded. The lid member 4 is molded by, for example, die casting.

The lid member 4 covers the opening end portion 101 of the resin outer shell 10 to have a function as a lid member (bracket) that closes the opening of the resin outer shell 10, a function as a bearing housing portion (bearing house) that supports the first bearing 71, and a function as a heat dissipation member that dissipates heat generated in the electronic part 51 inside the electric motor to the outside of the electric motor. The lid member 4 is fixed to the opening end portion 101 of the resin outer shell 10 using a plurality of screw members (not shown).

The plate portion 42 has an annular shape having a center hole 40 centered on the axial center C. The plate portion 42 includes an inner surface portion 424 that covers the opening end portion 101 of the resin outer shell 10, and an outer surface portion 423 opposite to the inner surface portion 424 (on the side of the opposite output end portion 61). In this embodiment, the outer diameter of the plate portion 42 is the same or substantially the same as the outer diameter of the opening end portion 101 of the resin outer shell 10. Further, as shown in FIG. 2 and FIG. 3, the first bearing housing portion 41, the fin portion 45, and the first regulatory portion 46 are formed on the outer surface portion 423 of the plate portion 42. An axial positioning portion 420, the annular protruding portion 43, and the protruding portion 44 are provided on the inner surface portion 424 of the plate portion 42.

The axial positioning portion 420, the annular protruding portion 43, and the protruding portion 44, which are provided on the inner surface portion 424 of the plate portion 42, will be described below.

The annular protruding portion 43 has a hollow cylindrical shape centered on the axial center C, protrudes from the side of the inner surface portion 424 of the plate portion 42 to the side of the circuit board 5, and comes into contact with the inner peripheral surface 10B of the resin outer shell 10.

The annular protruding portion 43 includes a hole having the same or substantially the same size as the center hole 40, and the rotation shaft 6 passes through the hole. The annular protruding portion 43 includes a disposition surface 431 that faces the circuit board 5, the protruding portion 44 described below being disposed on the disposition surface 431.

The cross section of the annular protruding portion 43 parallel to the axial center C is substantially rectangular. Further, although the annular protruding portion 43 is formed continuously in the circumferential direction without a break as shown in FIG. 4, the present technology is not limited thereto and part of the annular protruding portion 43 may have a cut.

The annular protruding portion 43 includes a radial-direction positioning portion 430. In this embodiment, the radial-direction positioning portion 430 abuts on the inner peripheral surface of the opening end portion 101 of the resin outer shell 10 and is formed on the outer peripheral surface of the annular protruding portion 43. That is, as shown in FIG. 2 and FIG. 4, the radial-direction positioning portion 430 has a cylindrical surface shape that fits into the inner peripheral surface 10B of the resin outer shell 10.

The protruding portion 44 is disposed on the disposition surface 431 of the annular protruding portion 43, protrudes from the side of the inner surface portion 424 of the plate portion 42 toward the side of the circuit board 5, and comes into thermal contact with the circuit board 5 (in this embodiment, the electronic part 51).

As shown in FIG. 2 and FIG. 4, in this embodiment, the protruding portion 44 is a rectangular parallelepiped block that protrudes toward the electronic part 51 mounted on the circuit board 5. Further, the protruding portion 44 has a facing surface 441 that faces the electronic part 51. Note that the shape of the protruding portion 44 is not limited to the rectangular parallelepiped shape and may be, for example, a columnar shape.

The shape of the facing surface 441 when viewed form the side of the electronic part 51 may be formed in accordance with the shape of the electronic part 51 and may be, for example, a rectangular flat surface (see FIG. 4). The facing surface 441 may be processed into a flat surface using, for example, a lathe after molding by die-casting or the like of the lid member 4.

A heat transfer member 52 and an adhesive member 53 are disposed between the electronic part 51 and the protruding portion 44 in order from the side of the electronic part 51, and the facing surface 441 of the protruding portion 44 comes into thermal contact with the electronic part 51 via the heat transfer member 52 and the adhesive member 53. The distance between the facing surface 441 and the electronic part 51 is set to be less than or equal to the sum of the thickness of the heat transfer member 52 and the thickness of the adhesive member 53. This allows the facing surface 441 to stably come into contact with the upper surface of the electronic part 51 via the heat transfer member 52 and the adhesive member 53. Note that the present technology is not limited thereto, and only one of the heat transfer member 52 and the adhesive member 53 may be disposed between the electronic part 51 and the protruding portion 44. Further, the lid member 4 does not necessarily need to include the protruding portion 44 integrally formed with the plate portion 42, and, for example, a heat transfer member that is separate from the lid member 4 and formed of a metal may be disposed between the inner surface of the plate portion 42 of the lid member 4 and the electronic part 51.

As the heat transfer member 52, one having favorable thermal conductivity and high insulation is favorable. For example, a heat dissipation sheet that is formed of a silicon resin is used. Similarly, as the adhesive member, one having favorable thermal conductivity and high insulation is favorable. For example, an adhesive that is formed of a silicon resin is used. The adhesive member 53 not only adheres the heat transfer member 52 and the protruding portion 44 to each other, but also absorbs variations in positions in the axial direction between the protruding portion 44 and the electronic part 51 by deformation of the adhesive member 53. Further, the adhesive member 53 releases the pressing force from the protruding portion 44 to the electronic part 51 by deformation of the adhesive member 53 when the heat sink 4 fits into the resin outer shell 10. This prevents excessive pressure from being applied to the electronic part 51 and ensures stable thermal connection between the protruding portion 44 and the electronic part 51.

The plate portion 42 includes the axial positioning portion 420. As shown in FIG. 4, the axial positioning portion 420 is formed on the side of the inner surface portion 424 of a first outer peripheral edge portion 422 of the plate portion 42. In this embodiment, the first outer peripheral edge portion 422 is a region of the plate portion 42 that is closer to the outer diameter side than the annular protruding portion 43.

The axial positioning portion 420 is formed on the side of the inner surface portion 424 of the first outer peripheral edge portion 422 and abuts on the opening end portion 101 of the resin outer shell 10. As shown in FIG. 2, the axial positioning portion 420 abuts on the opening end portion 101 in the direction of the axial center C. The axial positioning portion 420 may be processed into a flat surface using, for example, a lathe after molding by die-casting or the like of the lid member 4. In this embodiment, the axial positioning portion 420 is formed in a flat surface orthogonal to the axial center C.

Although the axial positioning portion 420 is formed in a flat surface in which the entire region on the side of the inner surface portion 424 of the first outer peripheral edge portion 422 is orthogonal to the axial center C as shown in FIG. 4, the present technology is not limited thereto. For example, the axial positioning portion 420 of the lid member 4 may include an annular protruding portion protruding toward the opening end portion 101, and may include an annular groove portion corresponding to the protruding portion in the opening end portion 101 of the resin outer shell 10. The cross section of this protruding portion when viewed from the radial direction may be trapezoidal or curved.

Further, as shown in FIG. 3 and FIG. 4, screw hole portions 421 into which screws are inserted are formed at a plurality of locations on the first outer peripheral edge portion 422 of the plate portion 42. In this embodiment, the screw hole portions 421 are provided at three positions on the first outer peripheral edge portion 422 at equal angular intervals. Note that the number and position of the screw hole portions 421 provided in the first outer peripheral edge portion 422 can be appropriately changed, and the screw hole portion 421 does not necessarily need to be provided in the first outer peripheral edge portion 422. Screw receiving portions (illustration omitted) are formed at positions facing the screw hole portion 421 in the opening end portion 101 of the resin outer shell 10. The lid member 4 is fixed to the opening end portion 101 of the resin outer shell 10 by a plurality of screws inserted into the respective screw hole portions 421. At this time, the lid member 4 is positioned in the circumferential direction with respect to the opening end portion 101 of the resin outer shell 10.

As described above, the lid member 4 according to this embodiment includes the axial positioning portion 420 that abuts on the opening end portion 101 of the resin outer shell 10 and the radial-direction positioning portion 430 that abuts on the inner peripheral surface of the opening end portion 101 of the resin outer shell 10. For this reason, at the same time as the lid member 4 is assembled to the resin outer shell 10, the lid member 4 is positioned in the axial direction and the radial direction with respect to the resin outer shell 10.

More specifically, the lid member 4 is provided with the axial positioning portion 420 that determines the relative position of the lid member 4 in the axial direction with respect to the resin outer shell 10, and the facing surface 441 of the protruding portion 44 that determines the relative position of the lid member 4 in the axial direction with respect to the electronic part 51 of the circuit board 5. For this reason, the accuracy of the relative position of the lid member 4 in the axial direction with respect to the resin outer shell 10 is ensured. This prevents excessive pressure from being applied to the electronic part 51, stably transfer heat from the electronic part 51 to the lid member 4, and sufficiently dissipate heat to the outside of the electric motor 1.

Further, by forming the radial-direction positioning portion 430 in the lid member 4, variations in the relative positions of the respective parts (position of one part relative to the position of the other part) when assembling the lid member 4 and the resin outer shell 10 in the radial direction can be reduced, and thus, the facing surface 441 of the protruding portion 44 of the lid member 4 can be accurately opposed to the electronic part 51 on the circuit board 5 fixed to the resin outer shell 10 in the axial direction. As a result, it is possible to stably transfer heat from the electronic part 51 to the lid member 4 and sufficiently dissipate heat to the outside of the electric motor 1.

The first bearing housing portion 41, the fin portion 45, and the first regulatory portion 46, which are provided on the outer surface portion 423 of the plate portion 42, will be described below.

The fin portion 45 is provided on the outer surface portion 423 of the plate portion 42, protrudes in the axial direction, and extends in the radial direction. The fin portion 45 includes a plurality of fins and is provided radially around the center hole 40 of the plate portion 42.

The lid member 4 transmits the heat generated in the electronic part 51 to the fin portion 45 via the above-mentioned protruding portion 44 and dissipates the heat to the outside of the electric motor 1 via the fin portion 45. In addition, in this embodiment, the cooling effect of the electric motor 1 can be further enhanced by the air flowing between the plurality of fins included in the fin portion 45 outside the electric motor 1. Note that the material of the fin portion 45 is not limited to aluminum and may be appropriately selected from materials suitable for heat-dissipating fins, such as an aluminum alloy and a magnesium alloy.

The first bearing housing portion 41 houses the first bearing 71 that rotatably supports the rotation shaft 6. The first bearing housing portion 41 has a cylindrical shape centered on the axial center C, through which the rotation shaft 6 passes, and houses the first bearing 71. In this embodiment, the first bearing 71 housed in the first bearing housing portion 41 is provided at a position higher than the protrusion height of the fin portion 45 in the axial direction.

First recessed portions 411a and first projecting portions 412a that are alternately provided in the circumferential direction are formed on the outer peripheral surface of the first bearing housing portion 41. A first vibration isolating member 12a described below is attached to the outer peripheral surface of the first bearing housing portion 41, the first vibration isolating member 12a engaging with the first recessed portion 411a and the first projecting portion 412a. In this embodiment, the first recessed portions 411a and the first projecting portions 412a are formed along the axial direction up to both ends in the axial direction on the outer peripheral surface of the first bearing housing portion 41. However, the present technology is not limited thereto, and the first recessed portions 411a and the first projecting portions 412a may be formed on part of the outer peripheral surface of the first bearing housing portion 41 in the axial direction along the axial direction on the outer peripheral surface of the first bearing housing portion 41.

The first regulatory portion 46 has a first regulatory surface 46A that is provided on the side of the outer surface portion 423 of the lid member 4 and comes into contact with the first vibration isolating member 12a described below. The first regulatory surface 46A regulates movement of the first vibration isolating member 12a to the side of the fin portion 45. In this embodiment, the first regulatory surface 46A is disposed between the first vibration isolating member 12a and the fin portion 45 in the axial direction to form a first gap H1 between the first vibration isolating member 12a and the fin portion 45.

The first regulatory portion 46 has a hollow disc shape that surrounds the periphery of the first bearing housing portion 41 with the axial center C as the center. The first gap H1 only needs to be a gap that does not allow the first vibration isolating member 12a and the fin portion 45 to come into contact with each other when external force toward the side of the fin portion 45 in the axial direction is applied to the first vibration isolating member 12a to vibrate (deform), and is, for example, 2 mm.

(Vibration Isolating Member)

Figure 6:
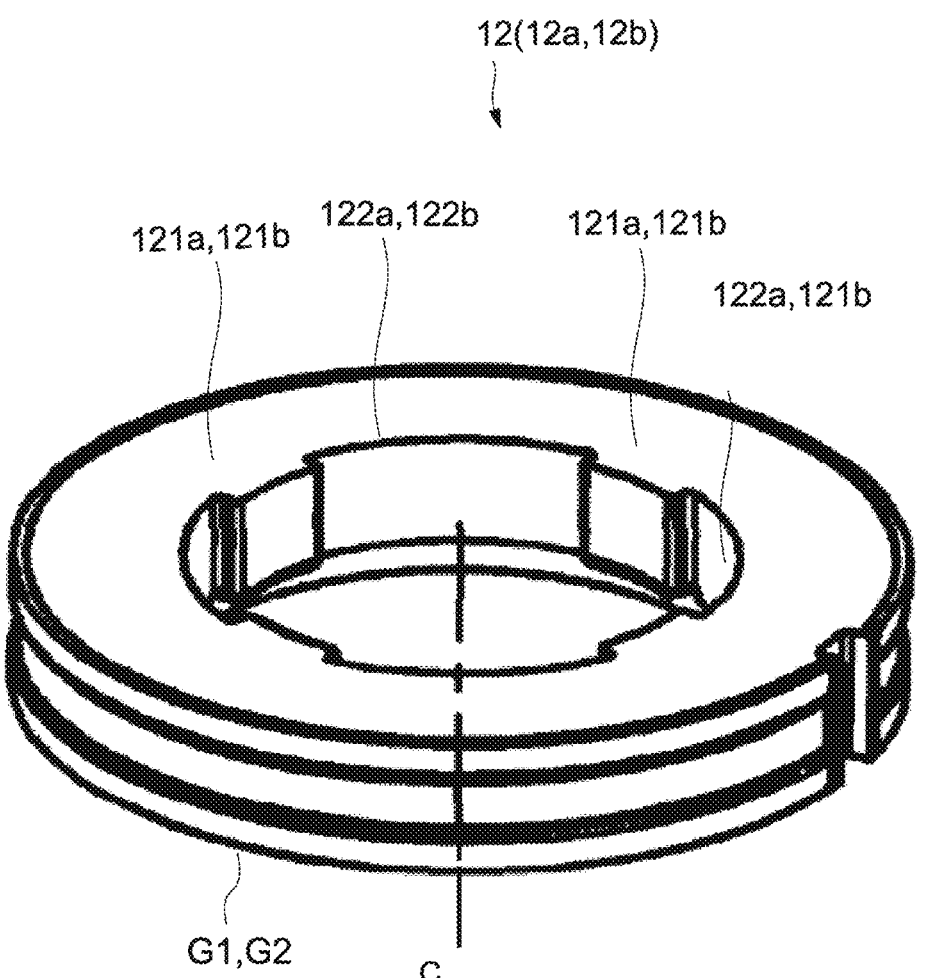
FIG. 6 is a diagram of a vibration isolating member when viewed from an upper surface side.
Figure 7:
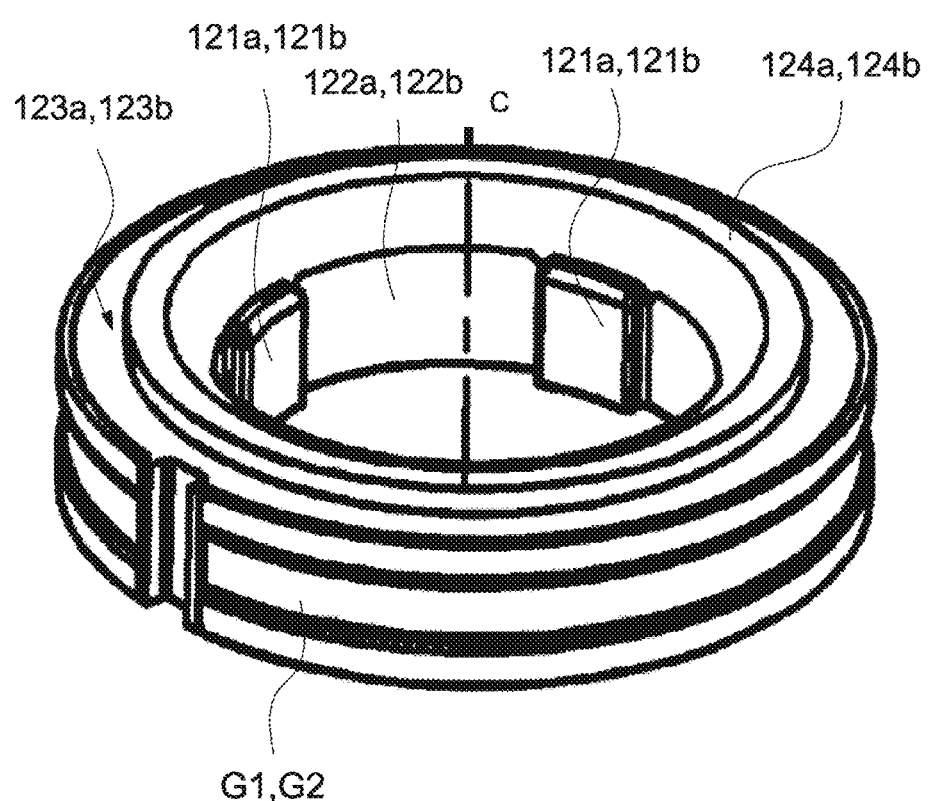
FIG. 7 is a diagram of a vibration isolating member when viewed from a lower surface side.

FIG. 6 is a perspective view of a vibration isolating member 12 when viewed from the upper surface side, and FIG. 7 is a perspective view of the vibration isolating member 12 when viewed from the lower surface side.

The vibration isolating member 12 includes the first vibration isolating member 12a to be attached to the side of the lid member 4, and the second vibration isolating member 12b to be attached to the side of the bottom portion 102 of the resin outer shell 10. In this embodiment, by forming the first vibration isolating member 12a and the second vibration isolating member 12b to have common shapes, the two vibration isolating members 12a and 12b can be attached without distinction. Note that the first vibration isolating member 12a and the second vibration isolating member 12b may have different shapes.

The vibration isolating member 12 is, for example, vibration isolating rubber, and a material having excellent vibration energy absorption is used.

As shown in FIG. 6 and FIG. 7, the first vibration isolating member 12a has a hollow cylindrical shape. A first engagement projecting portion 121a that engages with the first recessed portion 411a of the first bearing housing portion 41 and a first engagement recessed portion 122a that engages with the first projecting portion 412a of the first bearing housing portion 41 are formed on the inner peripheral side of the first vibration isolating member 12a. Further, on a lower surface 123a of the first vibration isolating member 12a, an annular first contact portion 124a that protrudes from the lower surface 123a toward the side of the fin portion 45 is formed. Here, the lower surface 123a of the first vibration isolating member 12a refers to a surface located on the side of the fin portion 45 while the first vibration isolating member 12a is attached to the first bearing housing portion 41 of the lid member 4.

When the first contact portion 124a comes into contact with the above-mentioned first regulatory surface 46A, the first vibration isolating member 12a is positioned in the axial direction with respect to the lid member 4. As a result, not only the first regulatory portion 46 formed on the side of the lid member 4 but also the first contact portion 124a formed on the side of the first vibration isolating member 12a is capable of forming a gap between the lower surface 123a of the first vibration isolating member 12a and the fin portion 45. Further, although the first contact portion 124a that protrudes from the lower surface 123a toward the side of the fin portion 45 is formed in an annular shape connected in the circumferential direction in this embodiment, the present technology is not limited thereto and a plurality of protrusions may be formed to be aligned annularly in the circumferential direction.

Further, since the predetermined gap H1 is formed between the first vibration isolating member 12a and the fin portion 45 by the first regulatory portion 46, it is possible to prevent heat dissipation from the fin portion 45 from being blocked by the first vibration isolating member 12a and improve heat dissipation.

A first mounting bracket G1 is attached to the outer peripheral surface of the first vibration isolating member 12a, and a fixture (not shown) for fixing it to, for example, a duct is attached to the first mounting bracket G1.

As shown in FIG. 6 and FIG. 7, the second vibration isolating member 12b has a hollow cylindrical shape. On the inner peripheral side of the second vibration isolating member 12a, a second engagement projecting portion 121b that engages with the second recessed portion 1021a formed on the cylindrical portion 102a of the resin outer shell 10 and a second engagement recessed portion 122b that engages with the second projecting portion 1022a formed on the cylindrical portion 102a are formed.

Further, on a lower surface 123b of the second vibration isolating member 12b, an annular second contact portion 124b that protrudes from the lower surface 123b toward the side of the bottom portion 102 of the resin outer shell 10 is formed. Here, the lower surface 123b of the second vibration isolating member 12b refers to a surface located on the side of the bottom portion 102 while the second vibration isolating member 12b is attached to the cylindrical portion 102a of the resin outer shell 10.

The second contact portion 124b comes into contact with the bottom portion 102 of the resin outer shell 10 described above to position the second vibration isolating member 12b in the axial direction with respect to the resin outer shell 10. Then, the second contact portion 124b forms a third gap H3 between a second regulatory surface 1021c described below and the lower surface 123b of the second vibration isolating member 12b.

The third gap H3 only needs to be a gap that does not allow the lower surface 123b of the second vibration isolating member 12b and the second regulatory surface 1021b or the bottom surface 102b do not come into contact with each other when the second vibration isolating member 12b vibrates toward the side of the bottom surface 102b in the axial direction, and is, for example, 2 mm.

The second contact portion 124b is annularly provided and comes into contact with the second regulatory portion 102c described below to position the second vibration isolating member 12b in the axial direction with respect to the resin outer shell 10.

A second mounting bracket G2 as attached to the outer peripheral surface of the second vibration isolating member 12b, similarly to the first vibration isolating member 12a, and a fixture (not shown) for fixing it to, for example, a duct is attached to the second mounting bracket G2. By attaching the fixtures to the above-mentioned first mounting bracket G1 and second mounting bracket G2, the electric motor 1 is fixed to the duct or the like.

Figure 8:
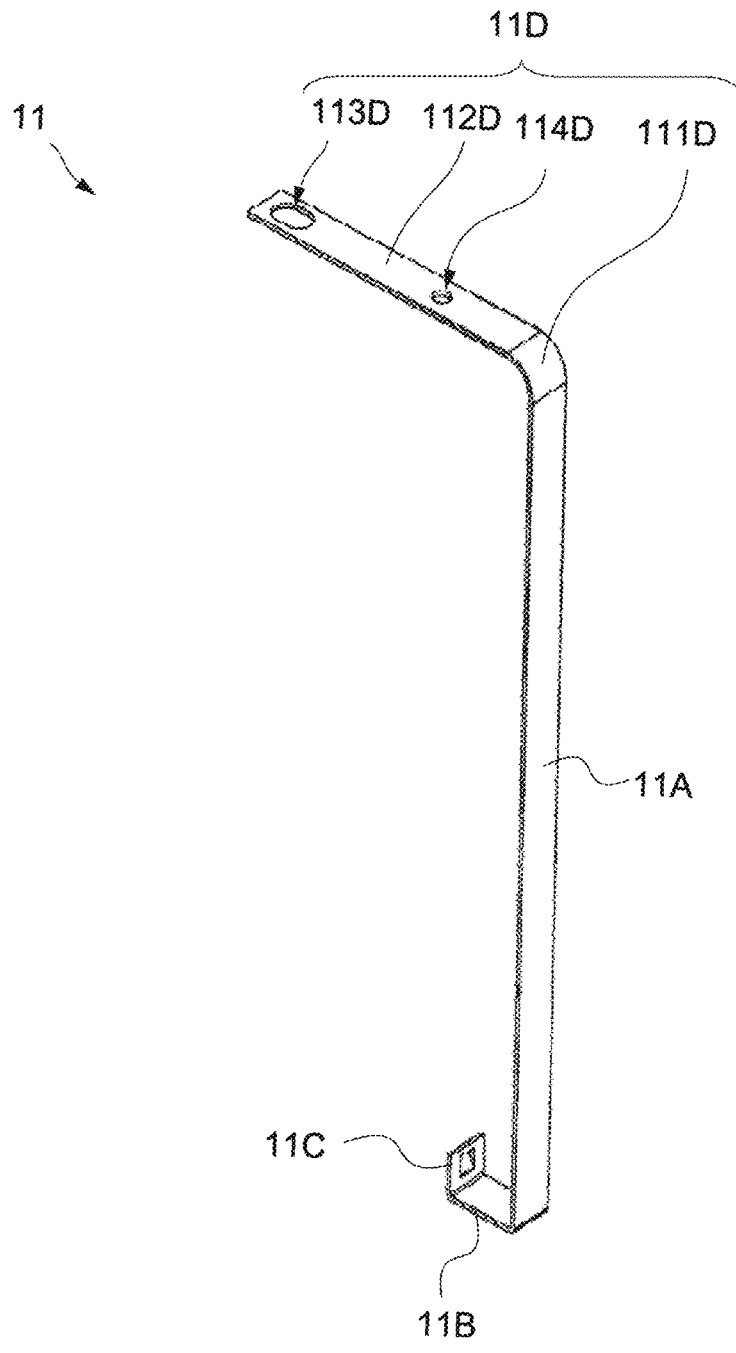
FIG. 8 is a perspective view of a metal member.
Figure 9:
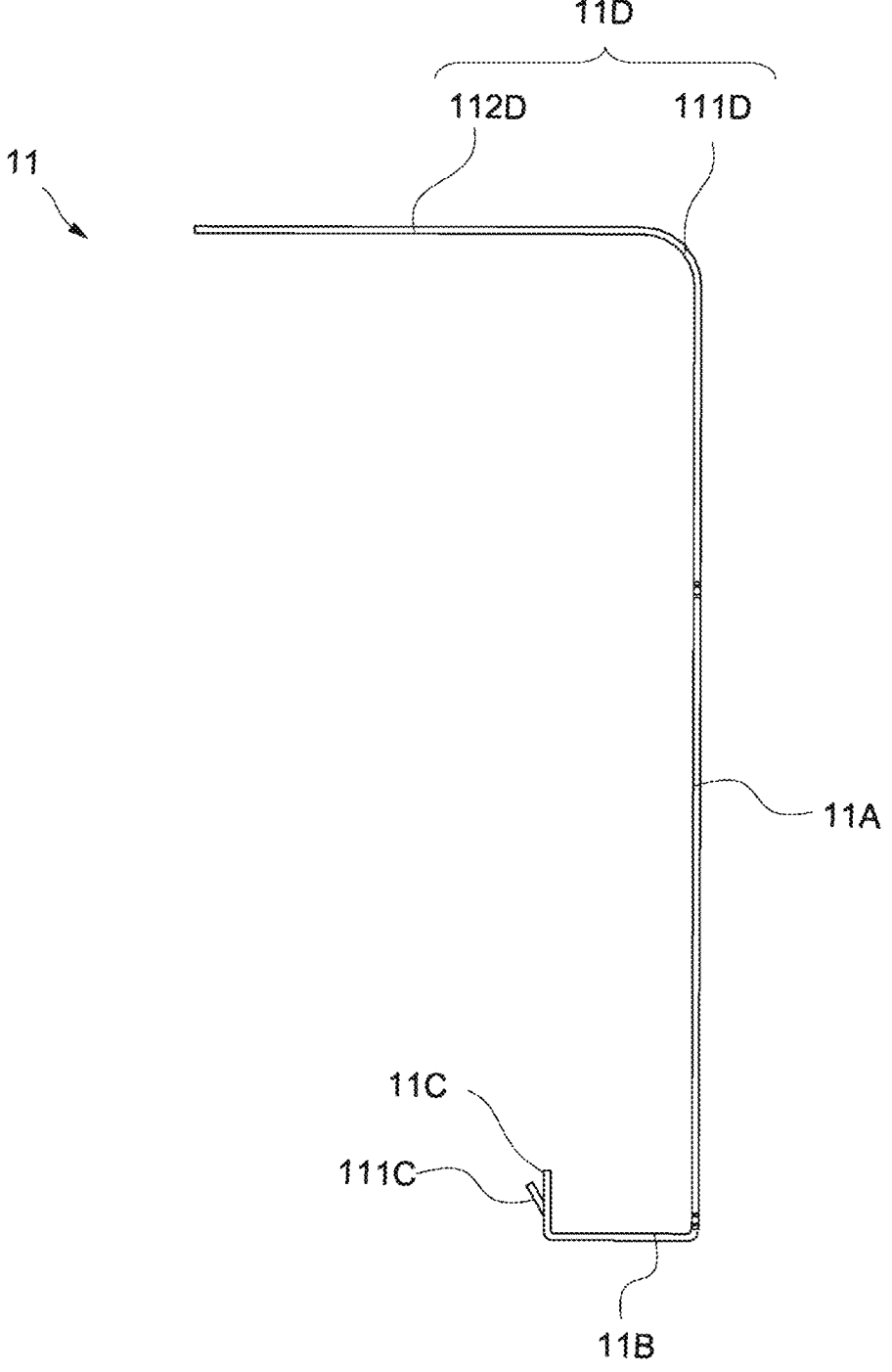
FIG. 9 is a side view of the metal member.

FIG. 8 is a perspective view of the metal member 11, and FIG. 9 is a side view of the metal member 11.
(Metal Member)

As shown in FIG. 1, FIG. 2, FIG. 8, and FIG. 9, the metal member 11 is formed in a bent shape along the outer shape of the resin outer shell 10 from the inner peripheral surface 10B to the bottom portion 102. The metal member 11 is housed in the above-mentioned groove portion 10b.

The metal member 11 is formed by processing, for example, a conductive metal material (such as stainless steel SUS304) into a band shape.

Further, as shown in FIG. 9 and FIG. 10, the metal member 11 includes the first metal portion 11A, the second metal portion 11B, the third metal portion 11C, and the fourth metal portion 11D.

The first metal portion 11A is disposed on the outer peripheral surface 10A of the resin outer shell 10 along the axial direction and housed in the first groove portion 101b. In this embodiment, the first groove portion 101b is located between two outer-peripheral-surface projecting portions 10a adjacent to each other in the circumferential direction on the outer peripheral surface 10A of the resin outer shell 10.

The second metal portion 11B is continuous with the first metal portion 11A on the side of the opening end portion 101, disposed along the radial direction of the resin outer shell 10 of the opening end portion 101, and housed in the second groove portion 102b.

The third metal portion 11C is continuous with the second metal portion 11B, disposed on the inner peripheral surface 10B of the resin outer shell 10 along the axial direction, and housed in the third groove portion 103b.

The fourth metal portion 11D is continuous with the first metal portion 11A and comes into contact with the second bearing housing portion 82. The fourth metal portion 11D is disposed on the bottom portion 102 along the radial direction and housed in the fourth groove portion 104b.

In this embodiment, when the metal member 11 (the first metal portion 11A to the fourth metal portion 11D) is housed in the corresponding groove portion 10b (the first groove portion 101b to the fourth groove portion 104b) formed in the resin outer shell 10, it is possible to prevent the metal member 11 from shifting and being fixed in the circumferential direction. Further, even in the case where the metal member 11 is formed by a plate-shaped member having a large thickness, it is possible to prevent the metal member 11 from protruding from the outer peripheral surface of the resin outer shell 10.

Further, since a plurality of outer-peripheral-surface projecting portions 10a that protrudes from the outer peripheral surface 10A of the resin outer shell 10 in the outer diameter direction is formed in the circumferential direction in the resin outer shell 10 according to this embodiment, air flowing outside the electric motor 1 is difficult to pass through a portion of the outer peripheral surface 10A of the resin outer shell 10 located between the outer-peripheral-surface projecting portions 10a. In this regard, in this embodiment, the first groove portion 101b formed on the outer peripheral surface 10A of the resin outer shell 10 is located between the two outer-peripheral-surface projecting portions 10*a* adjacent to each other in the circumferential direction. As a result, it is possible to locate the first metal portion 11A of the metal member 11 between the two outer-peripheral-surface projecting portions 10*a* adjacent to each other in the circumferential direction on the outer peripheral surface 10A of the resin outer shell 10, and improve heat dissipation by transferring, to the lid member 4 via the metal member 11, heat from a portion of the outer peripheral surface 10A of the resin outer shell 10 through which air is difficult to pass.

Note that although a case where the first metal portion 11A is formed of a band-shaped plate has been illustrated, the present technology is not limited thereto. The first metal portion 11A may have a fin shape that protrudes in the radial direction, similarly to the outer-peripheral-surface projecting portion 10*a* of the resin outer shell 10, or a rating plate may also be used. In the case of a rating plate, a band-shaped metal plate that is connected to the rating plate and extends from both ends of the rating plate in the axial direction may be disposed. As a result, it is possible to increase the surface area on the outer peripheral surface 10A of the resin outer shell 10 and thus improve heat dissipation.

Further, in the case where the first metal portion 11A has a fin shape similar to the outer-peripheral-surface projecting portion 10*a* of the resin outer shell 10, it is possible to increase the surface area on the outer peripheral surface 10A of the resin outer shell 10 and thus improve heat dissipation.

In this embodiment, the second metal portion 11B faces the axial positioning portion 420 of the lid member 4 with a predetermined distance. Further, as shown in FIG. 1 and FIG. 2, the second metal portion 11B is located at a position overlapping with the fin portion 45 when viewed from the axial direction. The predetermined distance is not particularly limited, but is, for example, 0.3 mm.

The third metal portion 11C includes an elastic contact portion 111C that comes into thermal contact with and elastically comes into contact with the annular protruding portion 43 (radial-direction positioning portion 430). Here, the phrase "comes into thermal contact with (thermally connected)" refers to heat transfer between two members in contact with (connected to) each other by heat conduction. Further, the third metal portion 11C is disposed at a position overlapping with the fin portion 45 when viewed from the axial direction.

The elastic contact portion 111C is pushed into the third groove portion 103*b* of the inner peripheral surface 10B of the resin outer shell 10 by the annular protruding portion 43 when the lid member 4 is fitted into the resin outer shell 10. At this time, the elastic contact portion 111C of the metal member 11 elastically comes into contact with the lid member 4, making it possible to stably achieve a conductive state between the metal member 11 and the lid member 4. The length of the third metal portion 11C in the axial direction is the same or substantially the same as the length of the annular protruding portion 43 in the axial direction. Although a case where the third metal portion 11C is housed in the third groove portion 103*b* when pushed into the side of the inner peripheral surface 10B of the resin outer shell 10 by the annular protruding portion 43 has been illustrated, the present technology is not limited thereto and part of the elastic contact portion 111C may protrude from the third groove portion 103*b* in the inner diameter direction.

The fourth metal portion 11D includes a bent portion 111D that is provided in the first metal portion 11A on the side of the bottom portion 102 of the resin outer shell 10 and continuous with the first metal portion 11A, and a straight portion 112D that is continuous with the bent portion 111D and extends in the inner diameter direction.

The bent portion 111D is formed in a bent shape along the bottom portion 102. The bent portion 111D has spring properties in consideration of attachment to the resin outer shell 10. Further, the straight portion 112D includes a fastening hole 113D and a discrimination hole 114D. The fastening hole 113D is provided at a position overlapping with the through hole 1041*b* of the fourth groove portion 104*b* and the flange hole 822*a* of the second bearing housing unit 82 when viewed from the axial direction. The discrimination hole 114D is located closer to the bent portion 111D than the fastening hole 113D. Then, the fastening member N fastens the fastening hole 113D and the flange hole 822*a* via the through hole 1041*b*. Further, the discrimination hole 114D is a hole for identifying the metal member 11 attached to the electric motor 1 in this embodiment from a metal member used in another electric motor.

As a result, the first bearing housing portion 41 disposed in the lid member 4 and the second bearing housing portion 82 disposed in the resin outer shell 10 are electrically connected to each other.

(Effects of Metal Member)

In the case where the electric motor 1 is driven by a PWM inverter that performs high frequency switching, since the first bearing housing portion 41 and the second bearing housing portion 82 are not electrically connected to each other, a potential difference (shaft voltage) is generated between the inner ring 712 and the outer ring 711 of the first bearing 71 and between the inner ring 812 and the outer ring 811 of the second bearing 81.

When this shaft voltage reaches the dielectric breakdown voltage of the oil film inside the bearing, a current flows into the bearing to cause electrolytic corrosion in the bearing. The electrolytic corrosion is a phenomenon in which the bearing is damaged by discharge (electrical spark) that occurs when the respective shaft voltages between the inner ring 712 and the outer ring 711 of the first bearing 71 and between the inner ring 812 and the outer ring 811 of the second bearing 81 are high. When electrolytic corrosion occurs on the bearing, the scratches on the rolling surface of the bearing cause abnormal noise when the bearing rotates and a decrease in the rotational efficiency of the electric motor.

The metal member 11 electrically connects the first bearing housing portion 41 in which the first bearing 71 is housed and the second bearing housing portion 82 in which the second bearing 81 is housed to each other, and thus, the potentials of the outer rings 711 and 811 of the first bearing 71 and the second bearing 81 can be set to the same potential. By making the potential difference between the inner and outer rings of each bearing relatively small, it is possible to suppress occurrence of electrolytic corrosion. In this embodiment, when the third metal portion 11C that is one end side of the metal member 11 is electrically connected to the first bearing housing portion 41 (lid member 4) and the fourth metal portion 104*b* that is the other end side of the metal member 11 is electrically connected to the second bearing housing portion 82, the first bearing housing portion 41 and the second bearing housing portion 82 are electrically connected to each other.

Further, the heat generated in the stator 2 is transferred from the first metal portion 11A disposed on the outer peripheral surface 10A of the resin outer shell 10 to the third metal portion 11C and dissipated from the annular protruding portion 43 that comes into thermal contact with the third metal portion 11C via the fin portion 45. As a result, since the heat generated in the coil 22 and the stator core 21 that generates heat when energized can be transferred to the lid member 4 that includes the fin portion 45 having high heat dissipation, it is possible to improve the heat dissipation properties of the electric motor 1. As an example, in this embodiment, while the thermal conductivity of BMC that is the material of the resin outer shell 10 is approximately 0.9 (W/m·K), the thermal conductivity of stainless steel (SUS304) that is the material of the metal member 11 is approximately 16.7 (W/m·K), and the metal member 11 has a thermal conductivity 10 times or more higher than that of the resin outer shell 10. Then, since the thermal conductivity of aluminum that is the material of the lid member 4 is approximately 230 (W/m·K), the lid member 4 has a thermal conductivity 200 times or more higher than that of the resin outer shell 10. Therefore, in the present invention, it is possible to transfer the heat generated in the stator 3, via the metal member 11 having a higher thermal conductivity than the resin outer shell 10, to the lid member 4 having an even higher thermal conductivity, and improve the heat dissipation properties of the electric motor 1.

Although the second metal portion 11B faces the axial positioning portion 420 of the lid member 4 with a predetermined distance, the present technology is not limited thereto and the second metal portion 11B may come into contact with the axial positioning portion 420. In this case, the heat generated in the stator 2 is transferred to the fin portion 45 via the axial positioning portion 420, the heat of the fin portion 45 is transferred in the inner diameter direction, and the transferred heat is radially diffused and dissipated to the plurality of fin portions 45. As a result, since the generated in the stator 2 can be dissipated using not only the annular protruding portion 43 but also the entire lid member 4, it is possible to improve the dissipation properties of the electric motor 1.

Further, since the first groove portion 101b is provided on the outer peripheral surface 10 of the resin outer shell 10A, the distance between the stator 2 and the first metal portion 11A is shortened as shown in FIG. 2, and thus, the heat generated in the stator 2 can be radiated more easily.

Further, since the bent portion 111D of the fourth metal portion 11D has spring properties, it is possible to increase the contact area (contact density) between the first metal portion 11A and the first groove portion 101b when the metal member 11 and the resin outer shell 10 are attached. For this reason, the heat generated in the stator 2 can be easily dissipated via the first metal portion 11A.

(Bottom Portion of Resin Outer Shell)

As described above, the bottom portion 102 of the resin outer shell 10 has the bottom surface 102b, the cylindrical portion 102a, and the second regulatory portion 102c. Further, the fourth groove portion 104b is formed on the bottom portion 102, as described above.

As shown in FIG. 2 and FIG. 5, the second regulatory portion 102c is disposed on the bottom surface 102b and protrudes from the bottom surface 102b toward the side of the output end portion 62 in the axial direction. Further, the second regulatory portion 102c has a C-shape in which it is formed around the cylindrical portion 102a and the second regulatory portion 102c is interrupted at the position where the fourth groove portion 104b is formed when viewed from the axial direction. Further, the second regulatory portion 102c has the second regulatory surface 1021c having a C-shape that comes into contact with the second contact portion 124b of the second vibration isolating member 12b described above.

The second regulatory surface 1021c of the resin outer shell 10 has a size of a width D in the radial direction. The width D is favorably sider in the radial direction than the second contact portion 124b of the second vibration isolating member 12b when viewed from the axial direction.

Further, as shown in FIG. 2, the fourth groove portion 104b formed in the bottom portion 102 is formed to be continuous with the end portion of the first groove portion 101b formed in the outer peripheral surface 10A on the side of the bottom portion 102. Further, as shown in FIG. 5, the fourth groove portion 104b is formed along the radial direction so as to connect the end portion of the bottom portion 102 on the outer diameter side and one second recessed portion 1021a of the cylindrical portion 102a when viewed from the axial direction to each other. More specifically, on end portion of the metal member 11 (end portion located on the inner diameter side of the fourth metal portion 11D) is located in a region overlapping with the above-mentioned one second recessed portion 1021a of the cylindrical portion 102a in the fourth groove portion 104b when viewed from the axial direction. Here, the region overlapping with the recessed portion 1021a when viewed from the axial direction refers to a region located closer to the inner diameter side than the outer peripheral surface of the projecting portion 1022a formed in the cylindrical portion 102a in the bottom portion 102.

The through hole 1041b that penetrates the bottom portion 102 in the axial direction is formed at the position surrounded by the above-mentioned one second recessed portion 1021a in the fourth groove portion 104b. When the fourth metal portion 11D of the metal portion 11 is disposed in the fourth groove portion 104b of the bottom portion 102, the fastening hole 113D of the fourth metal portion 11D overlaps with the through hole 1041b of the fourth groove portion 104b and the flange hole 822a of the second bearing housing unit 82 when viewed from the axial direction, as described above. Then, the fastening member N fastens the fastening hole 113D and the flange hole 822a via the through hole 1041b.

As described above, the second bearing housing portion 82 includes the cylinder portion 821 and the flange portion 822, the cylinder portion 821 housing the second bearing 81 that rotatably supports the rotation shaft 6, the flange portion 822 extending in the outer diameter direction from one end of the cylinder portion 821 in the axial direction, at least one second recessed portion 1021a is formed on the outer peripheral surface of the cylindrical portion 102a of the resin outer shell 10, the second vibration isolating member 12b includes the engagement projecting portion 121b that engages with the second recessed portion 1021a of the cylindrical portion 102a, and at least part of the fastening member N that fastens the fourth metal portion 11D to the flange portion 822 is located in a region overlapping with the second recessed portion 1021a when viewed from the axial direction. As a result, it is possible to fasten the fourth metal portion 11D and the flange portion 822 using the region overlapping with the second recessed portion 1021a when viewed form the axial direction. For this reason, since the flange portion 822 can be miniaturized in the radial direction while securing a space for the flange portion 822 to be fastened to the fourth metal portion 11D, the production cost can be reduced.

Further, the second regulatory surface 1021c is annularly formed between the second vibration isolating member 12b and the fastening member N to form a second gap H2 between the second contact portion 124b and the fastening member N as a predetermined gap.

The second gap H2 only needs to be a gap that does not allow the second vibration isolating member 12b and the fastening member N to come into contact with each other when the second vibration isolating member 12b vibrates toward the side of the fastening member N in the axial direction due to external force, and is, for example, 1 mm or more.

As a result, it is possible to prevent the second contact portion 124b of the second vibration isolating member 12b from not coming into contact with the bottom surface 102b of the resin outer shell 10 (the second regulatory portion 102c) due to the contact the second vibration isolating member 12b with the fastening member N. Further, since the second vibration isolating member 12b and the fastening member N do not come into contact with each other, it is possible to prevent the second vibration isolating member 12b formed of vibration isolating rubber or the like from being scraped when it comes into contact with the fastening member N such as a screw.

Further, the width D of the second regulatory surface 1021c is wider in the radial direction than the second contact portion 124b when viewed from the axial direction. For this reason, it is possible to prevent the second contact portion 124b from coming into contact with the fastening member N.

Modified Example

Although the second regulatory surface 1021c has a C-shape with a gap in a region where the fourth groove portion 104b is formed in the above embodiment, the present technology is not limited thereto and a gap may be formed at a predetermined location.

Although four second recessed portions 1021a are formed in this embodiment, the present technology is not limited thereto and, for example, two or three second recessed portions 1021a may be formed in the circumferential direction. Even in this case, at least part of the fastening member N only needs to be provided at a position overlapping with one second recessed portion 1021a when viewed from the axial direction.

Further, although the second bearing housing portion 82 is housed in the cylindrical portion 102a of the resin outer shell 10 in this embodiment, the present technology is not limited thereto and, for example, part of the cylinder portion 821 of the second bearing housing portion 82 may be exposed from the cylindrical portion 102a.

REFERENCE SIGNS LIST 1 electric motor
2 stator
21 stator core
22 coil
3 rotor
31 permanent magnet portion
32 outer peripheral core
33 insulation member
34 inner peripheral core
4 lid member
41 first bearing housing portion
42 plate portion
43 annular protruding portion
44 protruding portion
420 axial positioning portion
430 annular protruding portion
5 circuit board 51 electronic part
52 heat transfer member
6 rotation shaft
71 first bearing
81 second bearing
821 cylinder portion
82 second bearing housing portion
822 flange portion
822a flange hole
10 resin outer shell
101 opening end portion
102 bottom portion
102a cylindrical portion
1021a second recessed portion (recessed portion)
102b bottom surface
102c second regulatory portion
1021c second regulatory surface
11 metal member
12 vibration isolating member
12b second vibration isolating member
121b engagement projecting portion (projecting portion)
123b lower surface
124b second contact portion
c axial center
N fastening member

The invention claimed is:

1. An electric motor, comprising:
a cylindrical resin outer shell that includes an opening end portion that is provided at an end portion on one side in an axial direction, a bottom portion that is provided at an end portion on the other side in the axial direction, and a cylindrical portion that protrudes from the bottom portion toward the other side in the axial direction;
a stator that includes a coil and a stator core that are integrally formed with the resin outer shell;
a rotor that includes a rotation shaft and is disposed on an inner diameter side of the stator;
a lid member that covers the opening end portion of the resin outer shell and includes a first bearing housing portion, the first bearing housing portion being formed of a metal and housing a first bearing that rotatably supports the rotation shaft;
a second bearing housing portion that is formed of a metal, at least part of the second bearing housing portion being held by the cylindrical portion of the resin outer shell;
a metal member that is disposed on an outer peripheral surface of the resin outer shell and electrically connects the first bearing housing portion and the second bearing housing portion to each other; and
a vibration isolating member that is attached to the outer peripheral surface of the cylindrical portion,
the second bearing housing portion including a cylinder portion and a flange portion, the cylinder portion housing a second bearing that rotatably supports the rotation shaft, the flange portion extending from the cylinder portion in an outer diameter direction,
at least one recessed portion being formed on an outer peripheral surface of the cylindrical portion of the resin outer shell,
the vibration isolating member including a projecting portion that engages with the recessed portion,
at least part of a fastening member being located in a region overlapping with the recessed portion when viewed from the axial direction, the fastening member fastening the metal member to the flange portion.

2. The electric motor according to claim 1, wherein
the vibration isolating member is disposed at a position
   overlapping with the fastening member when viewed
   from the axial direction.

3. The electric motor according to claim 2, wherein
the bottom portion further includes a regulatory portion
   that comes into contact with the vibration isolating
   member to form a predetermined gap between the
   vibration isolating member and the fastening member.

4. The electric motor according to claim 1, wherein
the second bearing housing portion protrudes from the
   bottom portion of the resin outer shell toward a side
   opposite to the opening end portion, and
the cylindrical portion of the resin outer shell covers the
   outer peripheral surface of the cylinder portion of the
   second bearing housing portion.

* * * * *